(12) United States Patent
Leventhal et al.

(10) Patent No.: US 6,471,305 B1
(45) Date of Patent: Oct. 29, 2002

(54) ISOLATION VALVE ARMATURE CONFIGURED TO REDUCE BERNOULLI FORCE DURING NORMAL BRAKING OPERATION

(75) Inventors: Leon Leventhal, Canton; Shinya A. Takada, Ann Arbor; John Hildebrand, Royal Oak, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/340,492

(22) Filed: Jun. 30, 1999

(51) Int. Cl.⁷ .................................................. B60T 8/36
(52) U.S. Cl. ................ 303/119.2; 251/120; 251/129.02
(58) Field of Search ............................ 303/119.1, 119.2, 303/84.2; 251/120, 129.02, 129.05

(56) References Cited

U.S. PATENT DOCUMENTS

| | | | |
|---|---|---|---|
| 4,021,152 A | | 5/1977 | Toyoda |
| 4,531,708 A | * | 7/1985 | Livet ..................... 251/129.02 |
| 4,791,958 A | | 12/1988 | Brundage |
| 4,941,447 A | * | 7/1990 | Mannhardt ............. 251/129.16 |
| 4,961,561 A | * | 10/1990 | Kamibayasi ................ 251/120 |
| 5,011,113 A | * | 4/1991 | Stobbs et al. .......... 251/129.16 |
| 5,253,676 A | * | 10/1993 | Craig .................... 137/625.61 |
| 5,364,067 A | | 11/1994 | Linkner, Jr. |
| 5,669,675 A | | 9/1997 | Mueller et al. ........... 303/119.2 |
| 5,752,750 A | | 5/1998 | Lubischer et al. |
| 5,791,747 A | * | 8/1998 | Sorensen et al. ........ 303/119.2 |
| 5,810,330 A | * | 9/1998 | Eith et al. ................ 303/119.2 |
| 5,887,621 A | * | 3/1999 | Doll ....................... 251/129.07 |
| 6,026,847 A | | 2/2000 | Reinicke et al. |
| 6,029,703 A | | 2/2000 | Erickson et al. |
| 6,047,945 A | | 4/2000 | Grove et al. |
| 6,065,495 A | | 5/2000 | Fong et al. |
| 6,065,734 A | | 5/2000 | Tackett et al. |
| 6,113,066 A | | 9/2000 | Hohl et al. |
| 6,161,539 A | | 12/2000 | Winter |

* cited by examiner

Primary Examiner—Douglas C. Butler
Assistant Examiner—Thomas Williams
(74) Attorney, Agent, or Firm—MacMillan, Sobanski & Todd, LLC

(57) ABSTRACT

An isolation valve for controlling fluid flow in a vehicular braking system, the valve comprising: a solenoid coil assembly; an armature moveably positioned within the solenoid coil assembly, the armature having a ball end engaging a ball seat and an edge groove at the ball end to modify Bernoulli force that affects movement of the armature when the solenoid coil assembly is de-energized. Another embodiment of the invention is an isolation valve for use in a hydraulic control unit for a vehicular brake system, the isolation valve comprising: a valve body housing defining a valve cavity; a valve stem mounted in the valve cavity, the valve stem having a coaxial fluid passage therethrough; a cylindrical sleeve mounted on the valve body surrounding the valve stem; an armature slidably mounted in the cylindrical sleeve and biased by a spring in a normally open position; the armature having a valve end for controlling fluid flow through the coaxial fluid passage, and an edge groove, an outer step, an is annular cavity, or a combination thereof at the valve end to modify Bernoulli force that affects movement of the armature. Also described is a method for making an isolation valve having the above described characteristics.

27 Claims, 7 Drawing Sheets

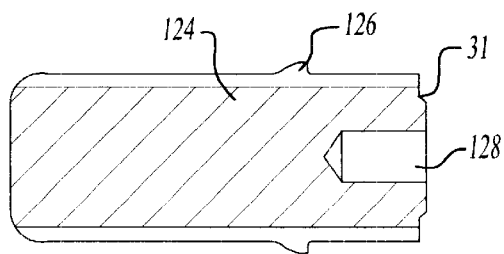
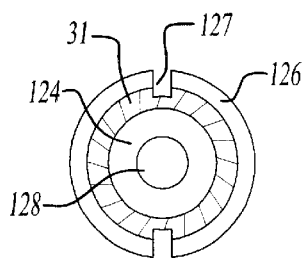
*Fig-7*     *Fig-8*
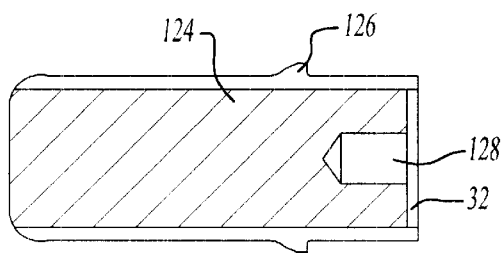
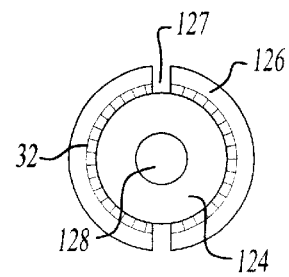
*Fig-9*     *Fig-10*
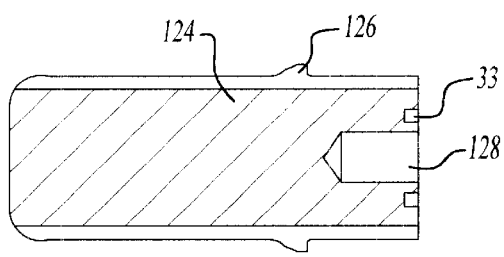
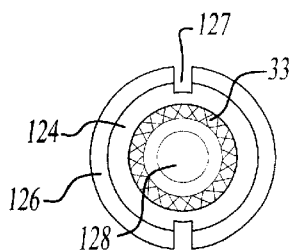
*Fig-11*     *Fig-12*
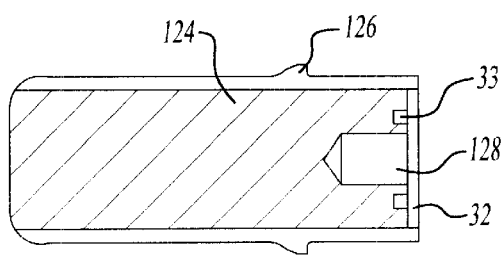
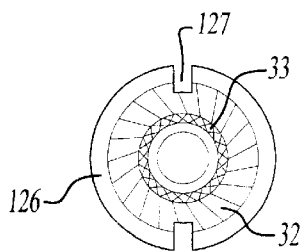
*Fig-13*     *Fig-14*

ISOLATION VALVE ARMATURE CONFIGURED TO REDUCE BERNOULLI FORCE DURING NORMAL BRAKING OPERATION

BACKGROUND OF THE INVENTION

This invention relates in general to vehicular brake systems and in particular is concerned with Bernoulli force during the operation of isolation valves in hydraulic braking systems.

Hydraulic braking systems for vehicles are well known. A typical hydraulic brake system includes a master cylinder connected via fluid conduits to wheel brakes. The master cylinder generates hydraulic forces by pressurizing brake fluid when the driver steps on the brake pedal. During a normal braking event, the pressurized fluid travels through the fluid conduits to actuate brake cylinders in the wheel brakes and slow the vehicle.

Anti-lock braking systems (ABS) are a feature of most modern hydraulic braking systems. A hydraulic control unit (HCU) or housing, containing control valves and other components such as low pressure accumulators and pumps, is located between the master cylinder and the wheel brake assemblies. An electronic controller connected to a variety of sensors operates the HCU to selectively control pressure to the wheel brake assemblies to provide an appropriate braking response.

Low pressure accumulators are provided in the HCU between a control valve known as a dump valve and an inlet to a pump. During an anti-lock (ABS) event, pressurized fluid is dumped from a wheel brake by opening a dump valve so that such fluid can travel to a low pressure accumulator. Fluid in the low pressure accumulator is pumped to an inlet of a control valve known as an isolation valve for reapply events of the brake system.

During braking events, isolation valves close and open and Bernoulli forces in the fluid resist the opening of the isolation valves. During a normal braking event when the valve is fully open, these Bernoulli forces are undesirable because they tend to close isolation valves thereby influencing the responsiveness of the breaking system and the distance required for completely stopping the vehicle. In contrast, during an ABS or other controlled braking event, these Bernoulli forces are desirable because they reduce the magnetic force required to hold the valve in a partially open condition.

Thus, it is desirable to reduce Bernoulli forces during normal braking events to increase isolation valve operation speed and improve response time and stopping distance without disrupting Bernoulli forces generated during controlled braking events.

SUMMARY OF THE INVENTION

This invention involves an improved armature for use in isolation valves in hydraulic braking systems. The improved armature is shaped to reduce Bernoulli forces during normal braking events to improve response time and stopping distance without disrupting Bernoulli forces generated during controlled braking events.

The isolation valve for controlling fluid flow in a vehicular braking system according to the present invention comprises a solenoid coil assembly and an armature moveably positioned within the solenoid coil assembly. In one embodiment, the armature has a ball end engaging a ball seat and an edge groove at the ball end to modify Bernoulli force that affects movement of the armature when the solenoid coil assembly is de-energized.

Another embodiment of the invention is an isolation valve for use in a hydraulic control unit for a vehicular brake system where the isolation valve comprises a valve body housing defining a valve cavity and a valve stem mounted in the valve cavity. The valve stem has a coaxial fluid passage therethrough. A cylindrical sleeve is mounted on the valve body surrounding the valve stem and an armature is slidably mounted in the cylindrical sleeve and biased by a spring in a normally open position. The armature has a valve end for controlling fluid flow through the coaxial fluid passage, and an outer step at the valve end to modify Bernoulli force that affects movement of the armature.

Another embodiment of the invention is an isolation valve for use in a hydraulic control unit for a vehicular brake system where the isolation valve comprises a valve body housing defining a valve cavity and a valve stem mounted in the valve cavity. The valve stem has a coaxial fluid passage therethrough. A cylindrical sleeve is mounted on the valve body surrounding the valve stem and an armature is slideably mounted in the cylindrical sleeve and biased by a spring in a normally open position. The armature has a valve end for controlling fluid flow through the coaxial fluid passage, and an annular cavity at the valve end to modify Bernoulli force that affects movement of the armature.

Still another embodiment of the invention is an isolation valve for use in a hydraulic control unit for a vehicular brake system where the isolation valve comprises a valve body housing defining a valve cavity and a valve stem mounted in the valve cavity. The valve stem has a coaxial fluid passage therethrough. A cylindrical sleeve is mounted on the valve body surrounding the valve stem and an armature is slideably mounted in the cylindrical sleeve and biased by a spring in a normally open position. The armature has a valve end for controlling fluid flow through the coaxial fluid passage, and an annular cavity and an outer step at the valve end to modify Bernoulli force that affects movement of the armature.

A further embodiment of the invention is a method of manufacturing an isolation valve for use in a hydraulic control unit for a vehicular brake system comprising the steps of: forming a valve cavity in a valve body housing; mounting a valve stem mounted in the valve cavity, the valve stem having a coaxial fluid passage therethrough; mounting a cylindrical sleeve in the valve body surrounding the valve stem; forming an armature having a valve end for controlling fluid flow through the coaxial fluid passage; configuring the valve end to modify Bernoulli force that affects movement of the armature; mounting the configured armature in the cylindrical sleeve so that it is slideable and biased by a spring in a normally open position. The valve end may be configured to modify Bernoulli force with an edge groove, an outer step, an annular cavity, or a combination of an outer step and an annular cavity.

Various objects and advantages of this invention will become apparent to those skilled in the art from the following detailed description of the preferred embodiments, when read in light of the accompanying drawings.

BRIEF DESCRIPTION OF THE DRAWINGS

FIGS. 7 and 8 are cross-sectional side and end views of an armature having an edge groove according to the present invention.

FIGS. 9 and 10 are cross-sectional side and end views of an armature having an outer step according to the present invention.

FIGS. 11 and 12 are cross-sectional side and end views of an armature having an annular cavity according to the present invention.

FIGS. 13 and 14 are cross-sectional side and end views of an annular cavity and an outer step according to the present invention.

DETAILED DESCRIPTION OF THE PREFERRED EMBODIMENTS

Figure 1:
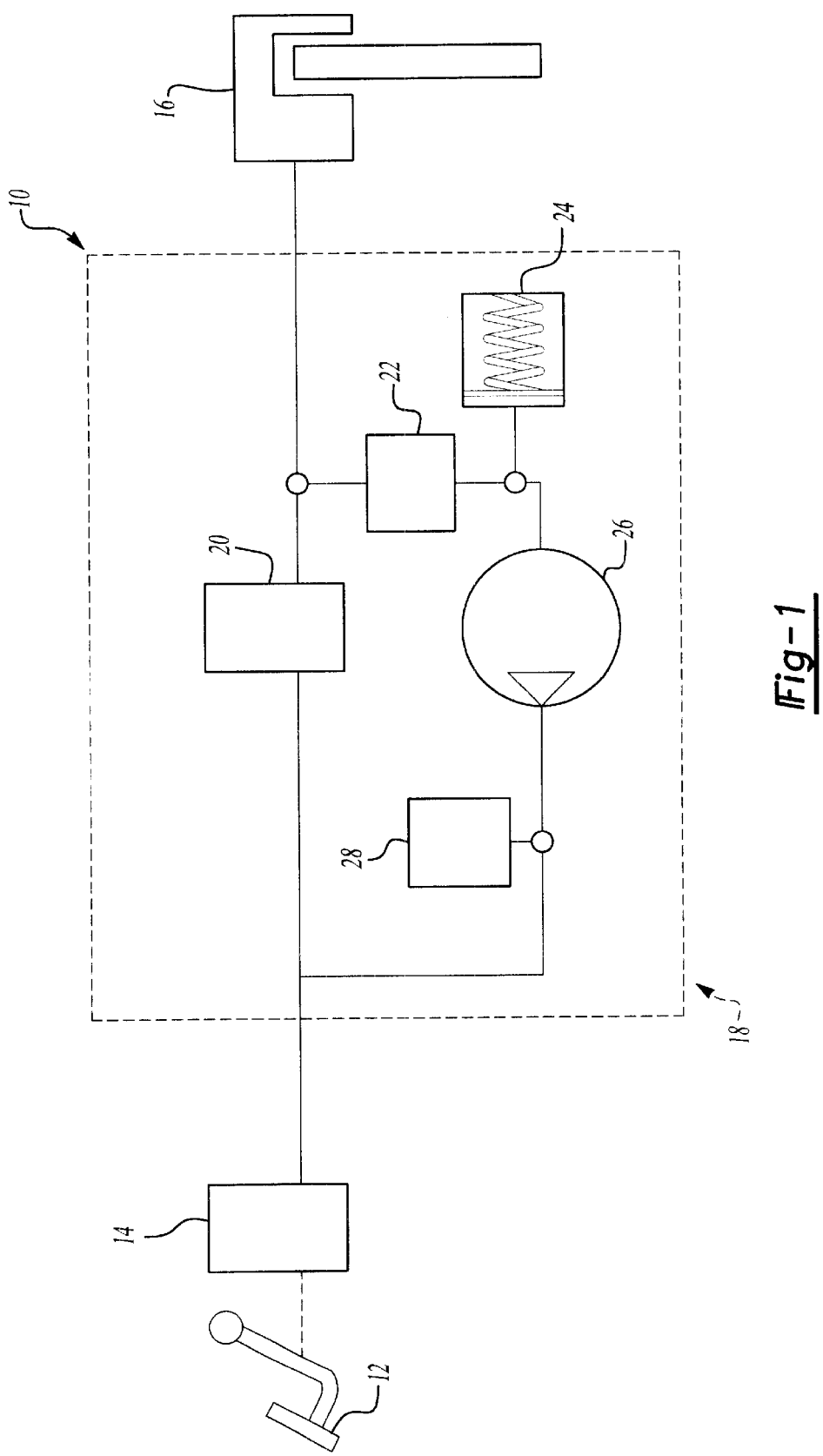
FIG. 1 is a schematic circuit diagram of a vehicular brake system according to this invention illustrating a low pressure accumulator, a dump valve, an isolation valve, and a pump in a hydraulic control unit.

A vehicular brake system according to this invention is indicated generally at 10 in FIG. 1. System 10 includes control valves and other components described below to provide anti-lock braking functions. In other embodiments, system 10 can also include components to provide traction control functions and/or vehicle stability control functions.

In system 10, a brake pedal 12 is connected to a master cylinder 14 to provide pressurized brake fluid to a wheel brake 16. In the embodiment illustrated in FIG. 1, the wheel brake 16 is illustrated as a disc assembly; however, wheel brake 16 may be any type found on vehicles.

A hydraulic control unit (HCU) 18 is a housing having bores for receiving control valves and other components described below. Fluid passageways or conduits are provided between the bores to provide fluid communication between the control valves and other components. For purposes of clarity of illustration, only one set of components is illustrated in the schematic of FIG. 1. However, it is understood that the HCU 18 can also house corresponding components for other circuits and/or wheels of the vehicle.

The HCU 18 includes a normally open control valve 20 commonly referred to as an isolation valve, and a normally closed control valve 22, commonly known as a dump valve, disposed between the master cylinder 14 and the wheel brake 16. A low pressure accumulator 24 is disposed between the dump valve 22 and a reciprocating hydraulic pump 26. The pump 26 is driven by an electric motor (not illustrated). An attenuator 28 is provided in the HCU 18 between an outlet of the pump 26 and an inlet of the isolation valve 20. The attenuator 28 dampens fluid pulses exiting the pump 26.

Both the isolation valve 20 and the dump valve 22 are preferably formed as a solenoid valve switchable between two positions. Valves 20 and 22, as well as pump 26, are electrically connected to an electronic control module (not illustrated) and operated to provide anti-lock or other types of controlled braking as required.

As the isolation valve operates, the path of fluid flowing through the valve is altered, creating Bernoulli forces that resist opening of the isolation valve. As mentioned above, during normal braking events, these Bernoulli forces must be overcome by the isolation valve mechanism, which takes additional time and requires additional force (factors that affect the overall performance of the hydraulic braking system).

In contrast, during a controlled braking event such as an ABS event, the isolation valve mechanism must hold the valve in a partially open state. During a controlled braking event, Bernoulli forces advantageously hold the valve partially open, decreasing demand on the coil.

Figure 2:
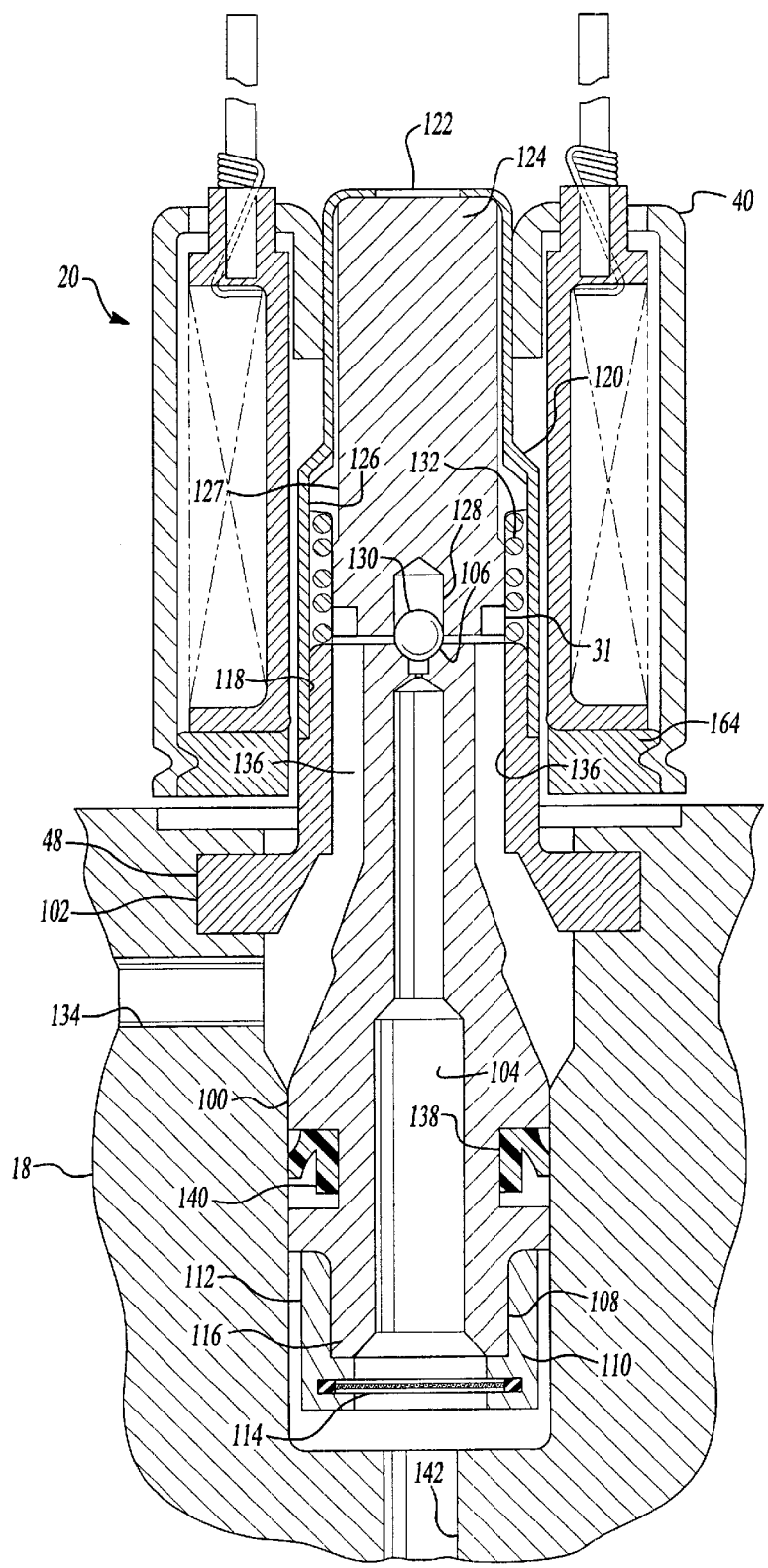
FIG. 2 is a partial sectional view of a hydraulic control unit showing an embodiment of an isolation valve according to the present invention.

FIG. 2 illustrates an isolation valve 20. The isolation valve 20 has a cylindrical valve body 100 having a radial flange 102. The valve body 100 has a coaxial flow passage 104 provided therethrough which terminates at its upper end in a conical valve seat 106. The lower end of the valve body 100 has a reduced diameter portion 108 which has an annular catch 110 adjacent to its lower end. A filter assembly 112 having a filter 114 is received over the reduced diameter portion 108 of the valve body 100. The filter assembly 112 has an internal recess 116 in which the annular catch 110 is received to snap lock the filter assembly 112 to the end of the valve body 100 so that the filter 114 covers the lower end of the coaxial flow passage 104.

A cylindrical sleeve 120 has an open lower end and a closed upper end 122. The open end is laser welded to the valve body 100 providing a fluid tight seal therebetween. The valve body 100 has a reduced diameter section 118 over which the open end of the sleeve 120 is received.

An armature 124 is slidably disposed in the sleeve 120. The armature 124 has an annular flange 126 and an axial bore 128 in which is received a valve member sized to engage the valve seat 106 and block the upper end of the coaxial flow passage 104.

The valve member is preferably a ball 130. The ball 130 is substantially non-deformable, for example, a steel ball. A coil spring 132 is disposed between the upper end of the valve body 100 and the flange 126 and resiliently biases the armature 124 away from the valve body 100 and the ball 130 away from the valve seat 106. As indicated, the armature 124 and the flange 126 have through slots 127 providing a fluid passageway between the flange 126 and the closed end 122 of the cylindrical sleeve 100. The slots 127 prevent a fluid lock-up condition inhibiting the rapid displacement of the armature 124 relative to the valve body 100.

A coil assembly such as coil assembly 40 shown in FIG. 2 is slideably received over the cylindrical sleeve 120 with a flux ring 164 being in close fitting, sliding engagement with valve body section 118. Optionally, to accommodate manufacturing tolerances, a slight clearance can be allowed between the flux ring 164 and sleeve 120. The coil assembly 40 is operative, when energized, to produce a magnetic field displacing the armature 124 towards the valve body 100 causing the ball 130 to seat on the valve seat 106. The seating of the ball 130 on the valve seat 106 terminates the fluid flow between the axial fluid inlet passage 104 and an outlet passageway 134 formed in the valve body housing 30 through internal passageways 136 formed in the valve body 100. The outlet fluid passageway 134 is connected to an associated threaded aperture and to the input of the associated hold/dump valve 22 as shown in FIG. 1.

As stated above, the coil assembly 40 includes an annular flux ring 164 disposed at the end adjacent the valve body housing 30. The flux ring 164 (as described in greater detail in commonly assigned U.S. Pat. No. 5,439,279, the disclosure of which is specifically incorporated by reference) enhances the strength of the magnetic field acting on the armature 124 and reduces the current required to produce a magnetic field having a strength sufficient to displace the armature 124 against the force of spring 132.

The valve body 100 further has an annular groove 138 in which is received a one-way seal 140 to prevent a fluid flow from the internal inlet passageway 142 of the valve body housing 30 to the outlet passageway 134. The internal inlet passageway 142 connects to an associated threaded aperture and to the master brake cylinder 16 and to the output of the pump 26 as shown in FIG. 1

In accordance with the present invention a variety of configurations may be formed around the end of the armature 124, such an edge groove 31 as illustrated in FIG. 2, to modify fluid flow in order to reduce Bernoulli forces during normal braking events, thereby improving response time and decreasing the required stopping distance.

Figure 3:
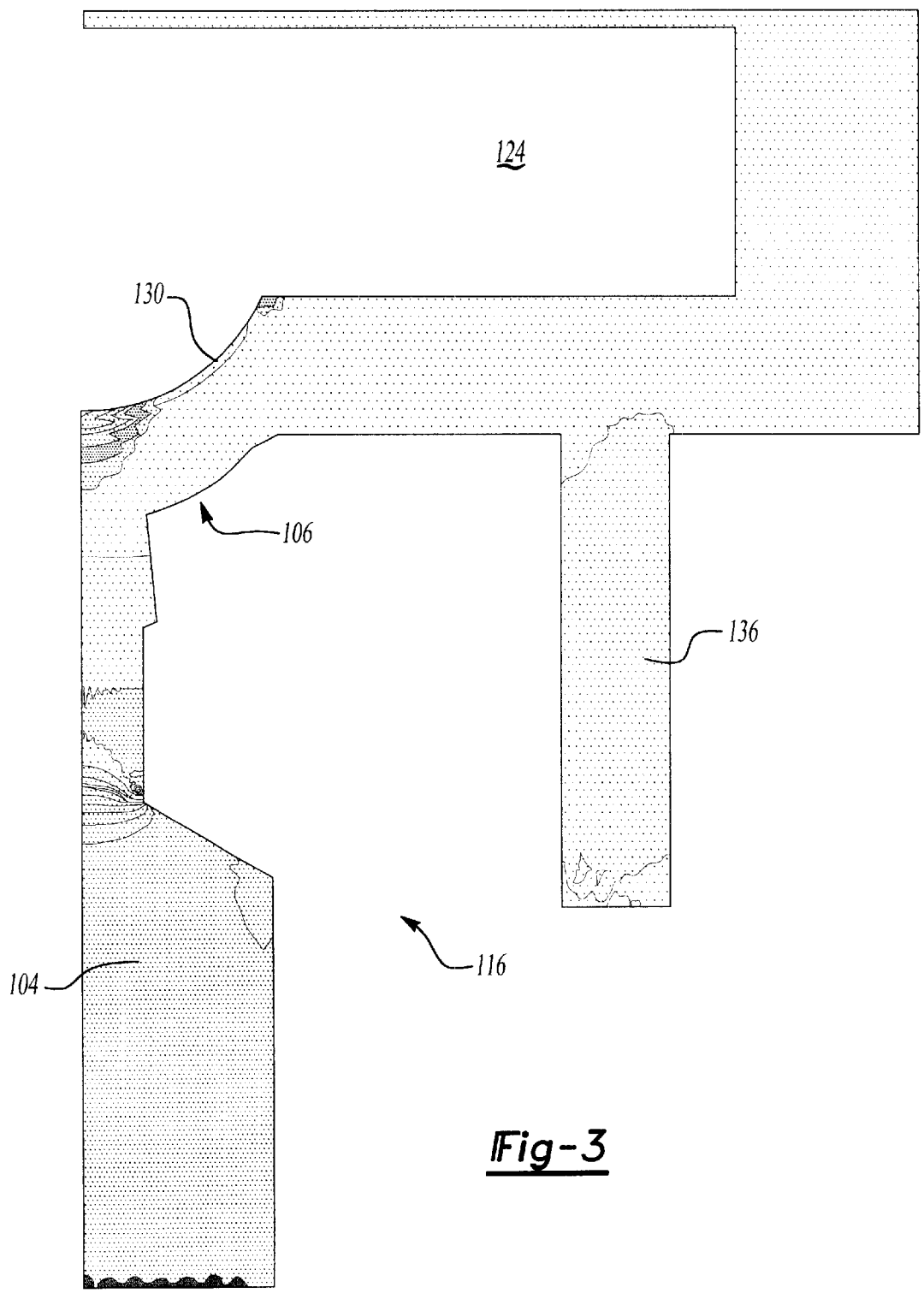
FIG. 3 is a partial view of a CFD simulation of the edge of an armature lacking an edge groove according to the present invention where the armature is in the open position during normal braking.
Figure 4:
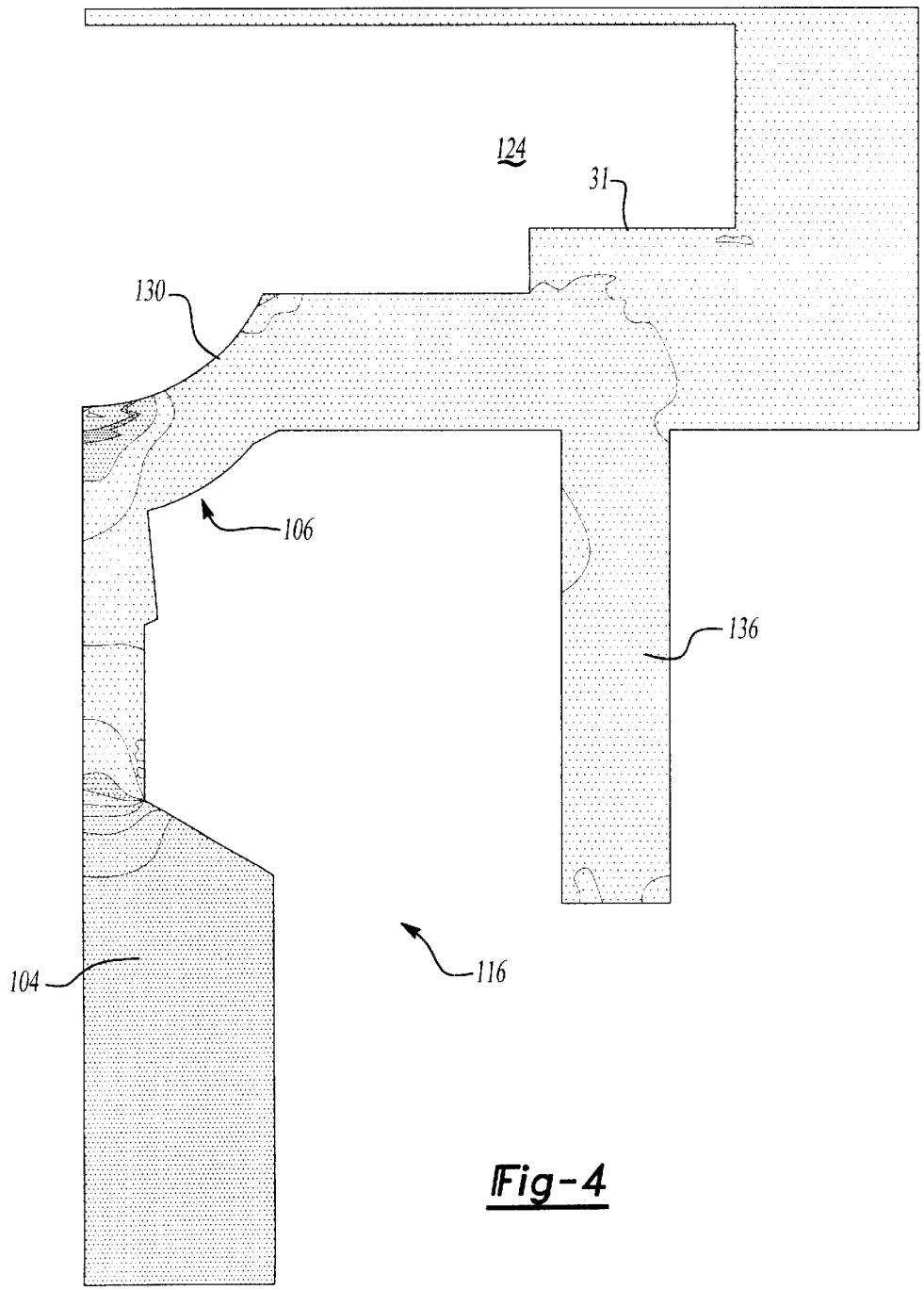
FIG. 4 is a partial view of a CFD simulation of the edge of an armature with an edge groove according to the present invention where the armature is in the open position during normal braking.
Figure 5:
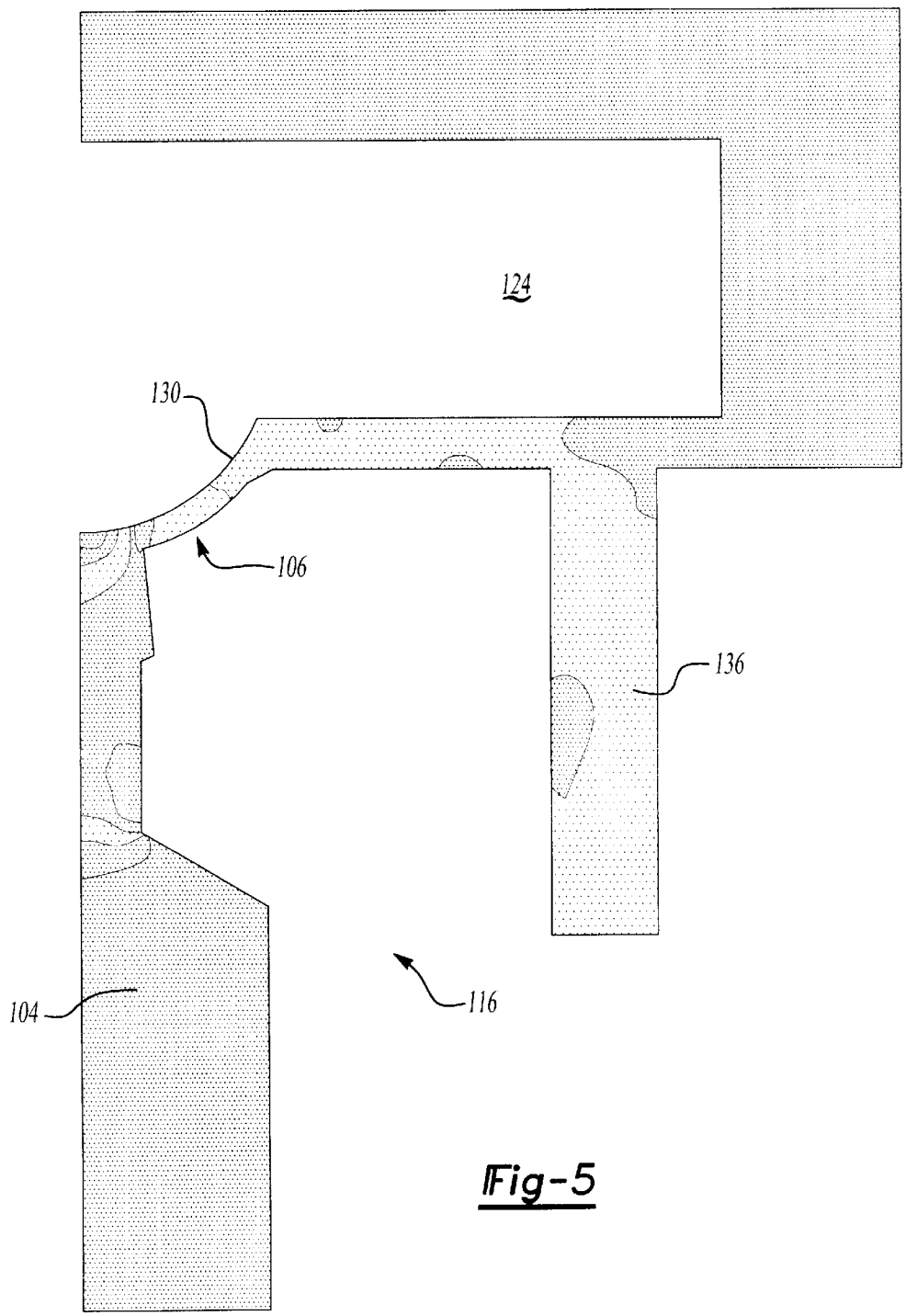
FIG. 5 is a partial view of a CFD simulation of the edge of an armature lacking the edge groove of the present invention where the armature is in the partially open position during a controlled braking event.

FIGS. 3–6 illustrate computational fluid dynamic (CFD) analysis models of isolation valves that lack a variation in the terminal end of the armature and that have an edge groove 31 in the terminal end of the armature. The components illustrated in FIGS. 3–6, except for the armatures in FIGS. 3 and 5, are identical in form and operation to the components of the isolation valve of FIG. 2 and are identified with corresponding numbers.

FIG. 3 illustrates the armature 124 having a ball 130 as a valve member fitting in a valve seat 106. The armature 124 is normally open permitting fluid communication between the coaxial flow passage 104 and the internal passageway 136. During a normal braking event, it was determined that a Bernoulli closing force of 3.70 Newton resisted movement of the armature 124 to the full open position as shown in FIG. 3. Overcoming this force required additional time, affecting the overall stopping power of the hydraulic braking system.

FIG. 4 illustrates a simulation of an embodiment of the invention where the armature 124 has been configured with an edge groove 31 (c.f. FIG. 2). Like FIG. 3, the armature 124 of FIG. 4 is normally open as shown in FIG. 3, permitting fluid communication between the coaxial flow passage 104 and the internal passageway 136. The detailed structure of an actual armature 124 having an edge groove is shown in cross-sectional side and end views in FIGS. 7 and 8.

During a normal braking event after closure of the isolation valve 20 it was determined that in an isolation valve having an edge groove 31 that the edge groove 31 reduced the Bernoulli force. In fact, the addition of the edge groove 31 in the armature 124 resulted in a Bernoulli opening force of 0.3 Newton. (Thus, the counter force has been replaced by a force of 0.3 Newton in the same direction as the movement of the armature 124 to the full open position as shown in FIG. 4.) This elimination of resistant Bernoulli force and establishment of a positive acting Bernoulli force results in quicker braking and reduced stopping distance.

FIG. 5 illustrates a simulation of the same armature shown in FIG. 3 in a partially open position as occurs during a controlled braking event. During a controlled braking event such as an ABS event, it was determined that a partial opening of the isolation valve having an armature without an edge groove was resisted by a Bernoulli closing force of 4.66 Newton.

Figure 6:
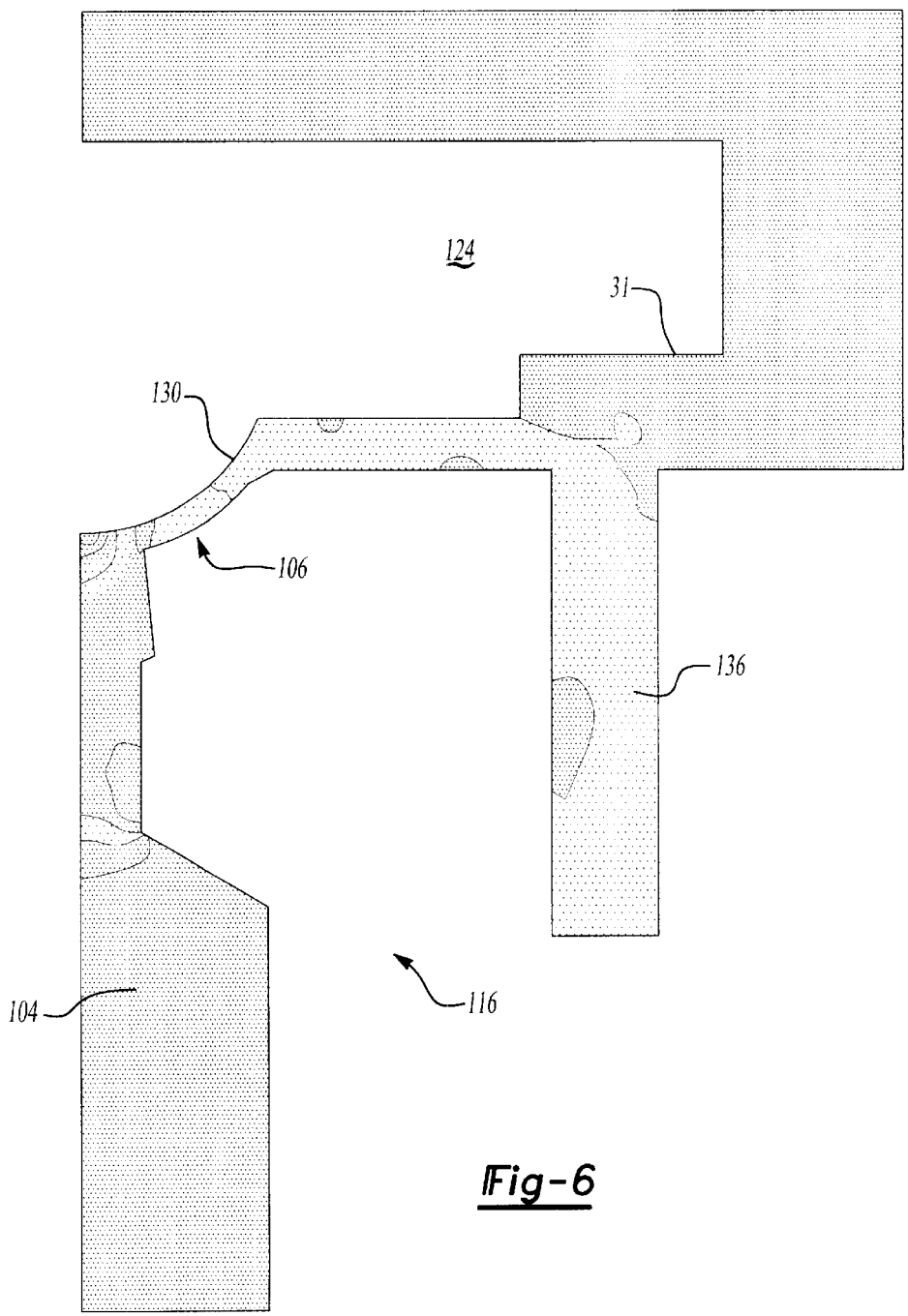
FIG. 6 is a partial view of a CFD simulation of the edge of an armature with an edge groove according to the present invention where the armature is in the partially open position during a controlled braking event.

FIG. 6 illustrates a simulation of an embodiment of the invention where the armature 124 has been configured with an edge groove 31 (c.f. FIG. 2). In contrast to the effect of an edge groove during normal braking, during a controlled braking event Bernoulli force generated when the isolation valve is partially open is not eliminated. In fact, it was determined that in an isolation valve having an edge groove 31 movement of the armature 124 from a closed position was resisted by a Bernoulli closing force of 4.32 Newton. Thus, the presence of the edge groove 31 did not significantly change the beneficial effect derived from Bernoulli force during controlled braking events.

The results of the individual tests are summarized in Table 1, below.

TABLE 1

|  | Bernoulli force when fully open (base supply) | Bernoulli force when partially open (ABS) |
|---|---|---|
| Isolation valve without edge groove | 3.70 N (closing) | 4.66 N (closing) |
| Isolation valve with edge groove | 0.30 N (opening) | 4.32 N (closing) |

In summary, the isolation valve without the edge groove exhibits 3.7 N Bernoulli (closing) force during a normal or base braking event when the valve is fully opened to a 0.6 mm gap. In contrast, the isolation valve with the edge groove 31 exhibits a 0.3 N Bernoulli (opening) force when the valve is fully opened to a 0.6 mm gap. During a controlled braking event such as an ABS event, the isolation valve without the edge groove exhibits 4.66 N Bernoulli (closing) force when the valve is partially opened to a 0.1 mm gap. In contrast with the effect during normal braking, the desirable Bernoulli force generated is not significantly changed by the edge groove during a controlled braking event. Rather, the isolation valve with the edge groove 31 exhibits 4.32 N Bernoulli (closing) force when the valve is opened to a 0.1 mm gap.

FIGS. 9–14 illustrate additional configurations of the armature that reduce Bernoulli force in the desired manner during normal breaking events and without significantly changing the Bernoulli force generated during a controlled braking event in a manner analogous to that described above with reference to an armature having an edge groove.

More specifically, FIGS. 9 and 10 are cross-sectional side and end views of an armature having an outer step 32, an armature 124, flange 126, axial grooves 127, and an axial bore 128; FIGS. 11 and 12 are cross-sectional side and end views of an armature having an annular cavity 33, an armature 124, flange 126, axial grooves 127, and an axial bore 128; and FIGS. 13 and 14 are cross-sectional side and end views of an armature having an outer step 32 and an annular cavity 33, an armature 124, flange 126, axial grooves 127, and an axial bore 128.

Another aspect of the present invention is a method of manufacturing an isolation valve for use in a hydraulic control unit for a vehicular brake system. This method comprising the following steps: forming a valve cavity in a valve body housing; mounting a valve stem in the valve cavity where the valve stem has a coaxial fluid passage therethrough; mounting a cylindrical sleeve on the valve body surrounding the valve stem; forming an armature having a valve end for controlling fluid flow through the coaxial fluid passage; configuring the valve end to modify Bernoulli force that affects movement of the armature; and mounting the configured armature in the cylindrical sleeve so that it is slideable and biased by a spring in a normally open position.

The valve cavity may be formed in the valve body and valve stem housing using any convenient method such as boring or casting. Similarly, the armature may be cast and configured using standard machining methods. Alternatively, the armature might be formed in the desired configuration using Metal Injection Molding (MIM) or a similar method.

The configuration of the valve end used to modify the Bernoulli force may be any of the configurations described herein (such as an edge groove, an outer step, or an annular cavity), or combinations of configurations (such as an outer step and an annular cavity). While the present invention has been described as used in specific embodiments of an isolation valve, it is understood that modifications to any control valve armature as described herein to reduce Bernoulli forces and increase response time is within the scope of the present invention.

In accordance with the provisions of the patent statutes, the principle and mode of operation of this invention have been explained and illustrated in its preferred embodiments. However, it must be understood that this invention maybe practiced otherwise than as specifically explained and illustrated without departing from its spirit or scope.

What is claimed is:

1. A valve for use in a vehicular brake system, comprising:
   a valve body with a valve seat and a flow passage through said valve seat; and
   an armature with a valve member and a groove, said valve member sized to engage said valve seat to block flow through said flow passage, said groove positioned and configured to produce a negligible Bernoulli force when said armature is in a fully opened position and a significant closing Bernoulli force when said armature is partially opened.

2. The valve according to claim 1, wherein said valve member is a ball.

3. The valve according to claim 1, wherein said valve member is a non-deformable ball.

4. The valve according to claim 1, wherein said valve member is a steel ball.

5. The valve according to claim 1, wherein said groove is positioned and configured to produce a slight opening Bernoulli force when said armature is in the fully opened position.

6. The valve according to claim 1, wherein said groove is positioned and configured to produce an opening Bernoulli force of about 0.3 Newton when said armature is in a fully opened position and a closing Bernoulli force of about 4.32 Newton when said armature is partially opened.

7. The valve according to claim 1, wherein said groove is an edge groove.

8. The valve according to claim 1, wherein said groove is an outer step.

9. The valve according to claim 1, wherein said groove is an annular cavity.

10. A valve for use in a vehicular brake system, comprising:
    an armature with a ball end and a groove at said ball end; and
    a seat, said ball end of said armature engageable with said seat, said groove positioned and configured to produce a negligible Bernoulli force when said armature is in a fully opened position and a significant closing Bernoulli force when said armature is partially opened.

11. The valve according to claim 10, wherein said valve member is a ball.

12. The valve according to claim 10, wherein said valve member is a non-deformable ball.

13. The valve according to claim 10, wherein said valve member is a steel ball.

14. The valve according to claim 10, wherein said groove is positioned and configured to produce a slight opening Bernoulli force when said armature is in the fully opened position.

15. The valve according to claim 10, wherein said groove is positioned and configured to produce an opening Bernoulli force of about 0.3 Newton when said armature is in a fully opened position and a closing Bernoulli force of about 4.32 Newton when said armature is partially opened.

16. The valve according to claim 10, wherein said groove is an edge groove.

17. The valve according to claim 10, wherein said groove is an outer step.

18. The valve according to claim 10, wherein said groove is an annular cavity.

19. A valve for use in a vehicular brake system, comprising:
    a valve body with a valve seat and a flow passage through said valve seat;
    an armature with a valve member and a groove, said valve member sized to engage said valve seat to block flow through said flow passage;
    a coil assembly operative, when energized, to produce a magnetic field to displace said armature to a closed position and said valve member toward said seat; and
    a coil spring, when said coil assembly is de-energized, resilient biases to an opened position said armature and said valve member away from said seat, wherein said groove is positioned and configured to produce a negligible Bernoulli force when said armature is in a fully opened position and a significant closing Bernoulli force when said armature is partially opened.

20. The valve according to claim 19, wherein said valve member is a ball.

21. The valve according to claim 19, wherein said valve member is a non-deformable ball.

22. The valve according to claim 19, wherein said valve member is a steel ball.

23. The valve according to claim 19, wherein said groove is positioned and configured to produce a slight opening Bernoulli force when said armature is in the fully opened position.

24. The valve according to claim 19, wherein said groove is positioned and configured to produce an opening Bernoulli force of about 0.3 Newton when said armature is in a fully opened position and a closing Bernoulli force of about 4.32 Newton when said armature is partially opened.

25. The valve according to claim 19, wherein said groove is an edge groove.

26. The valve according to claim 19, wherein said groove is an outer step.

27. The valve according to claim 19, wherein said groove is an annular cavity.

* * * * *